F. S. LOW.
CHLORIDIZING PROCESS AND APPARATUS.
APPLICATION FILED DEC. 27, 1920.
1,430,454.
Patented Sept. 26, 1922.
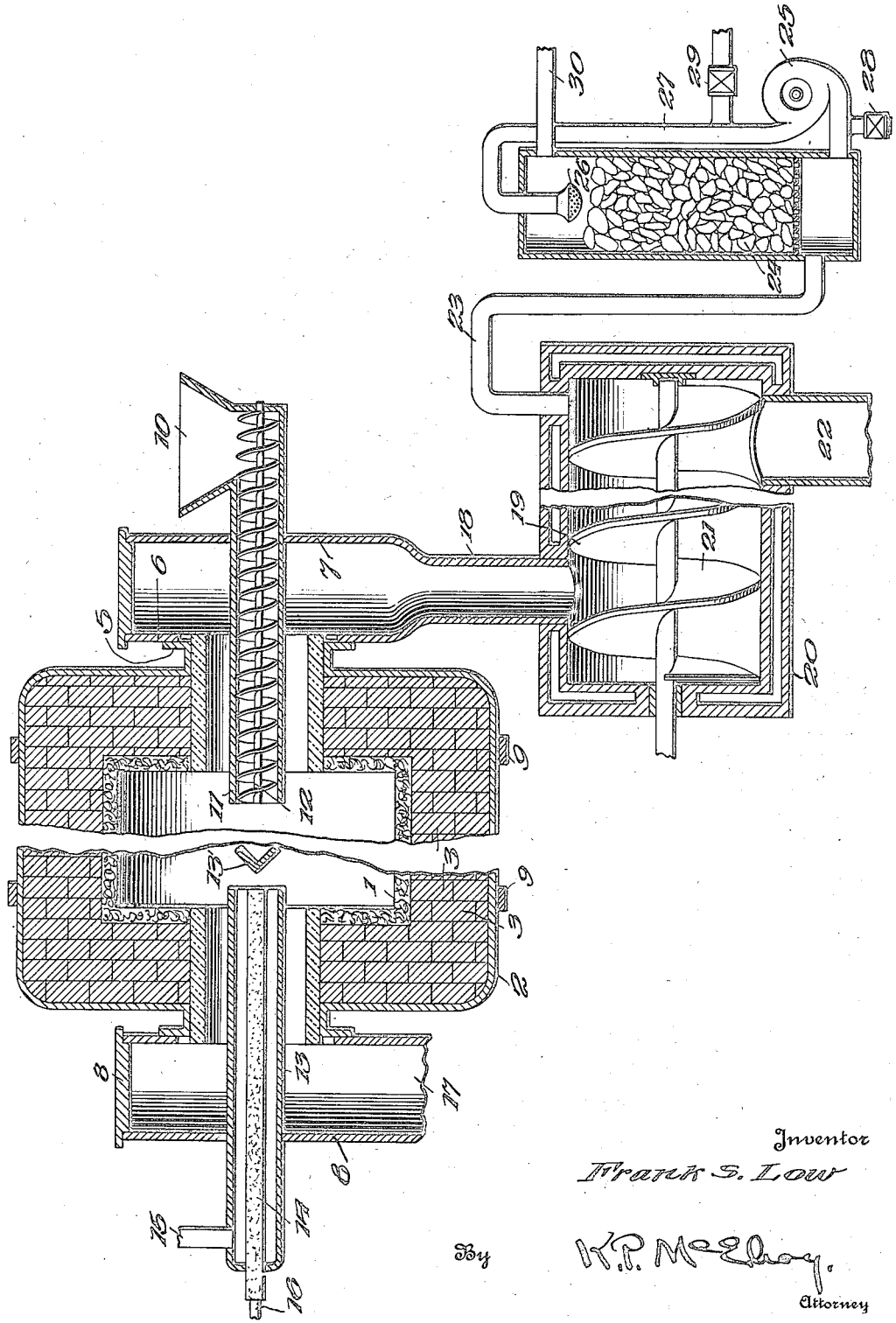
Inventor
Frank S. Low
By K. P. McElroy,
Attorney Patented Sept. 26, 1922.

1,430,454

UNITED STATES PATENT OFFICE.

FRANK S. LOW, OF NIAGARA FALLS, NEW YORK, ASSIGNOR TO NIAGARA ALKALI COMPANY, OF NIAGARA FALLS, NEW YORK, A CORPORATION OF NEW YORK.

CHLORIDIZING PROCESS AND APPARATUS.

Application filed December 27, 1920. Serial No. 433,470.

*To all whom it may concern:*

Be it known that I, FRANK S. LOW, a citizen of the United States, residing at Niagara Falls, in the county of Niagara and State of New York, have invented certain new and useful Improvements in Chloridizing Processes and Apparatus, of which the following is a secification.

This invention relates to chloridizing processes and apparatus; and it comprises a method of employing chlorin in various metallurgical and other processes requiring the action of chlorin at elevated temperatures wherein some, or all, of the necessary heat is supplied by combustion of chlorin and hydrogen in heat-transferring relationship to the material to be chlorinated; and it further comprises certain new and useful chloridizing apparatus, all as more fully hereinafter set forth and as claimed.

On treatment with chlorin at high temeratures, many materials form volatile chlorids which escape in the vapor form and can be suitably condensed. With unoxidized materials, such as the arsenid ores and speisses, sulfids, etc., chlorids are formed directly; but in the case of oxidized materials it is in general necessary to have hydrogen (as HCl) or carbon present to take care of the oxygen. With rich unoxidized ores the heat developed in the chloridizing operation may be sufficient, and often is to produce and volatilize the desired chlorid; but with poorer materials and with oxidized materials it is in general necessary to supply additional heat, performing the reaction in externally heated retorts. As it is difficult to find materials suitable for building such retorts which will withstand the action of and be impermeable to hot chlorin and hot chlorid vapors, this necessity for heating precludes the use of chlorination in many relations where it would otherwise be convenient and advantageous.

In the present invention I obviate the difficulty by supplying some or all of the heat necessary for reaction from a flame of hydrogen burning with chlorin and in heat-communicating relationship to the materials to be treated. With such a flame it is not difficult to obtain temperatures well in excess of 1000° C. Regeneration may be used in attaining even higher temperatures. Any type of high temperature gas burner may be used; but for obvious reasons it is best made of graphite or fused quartz. In obtaining a quick-burning, high temperature flame it is better to use either the chlorin or the hydrogen in some excess over the theoretical quantities (equal volumes), and in various embodiments of my process it is sometimes convenient to use the one and sometimes the other, according to whether reducing or (so to speak) oxidizing conditions are to prevail. All of the chlorin or of the hydrogen used in the operation may go in with the flame jet; or some of either may be introduced apart from the flame. Where reduction (removal of oxygen) is necessary in forming the volatile chlorid, the hydrogen present performs this office. Carbon may be employed admixed with the charge where more energetic reduction is necessary.

The employment of a chlorin-hydrogen flame renders chloridization convenient for the recovery or removal of materials forming volatile chlorids and existing in small proportions in ores or other materials to be treated or purified. It is, for example, convenient in removing small proportions of iron existing in all sorts of materials, clay, bauxite and fused alumina refractories, etc. Iron can be so removed from any material not affected by hydrogen and chlorin (or HCl). Similarly arsenic, antimony and tin can be removed or recovered from ores and materials containing very little of these bodies.

The body to be chloridized and recovered or removed need not necessarily form a volatilizable chlorid where a subsequent leaching of the treated materials is permissible. For example, in the case of certain ores containing small amounts of cobalt, nickel, etc., after chlorination, the chlorids may be leached out.

The combustion of course produces HCl gas and this HCl can be recovered in the usual ways in aqueous solution, that is, as muriatic acid or hydrochloric acid.

While the described invention may be used in many other ways, I shall hereinafter describe it more particularly as applied to the removal of iron contained as an impurity in various commercial materals. This iron is sometimes in the metallic state; but more frequently it is present as an oxid; magnetic oxid, ferric oxid or ferrous oxid, as the case may be. In any of these forms it is converted by chlorin in the presence of hydrogen (HCl) into a chlorid volatile at the temperatures here contemplated. Alumina, chromium oxid and many other refractory materials requiring purification are not so affected under properly regulated conditions. For example, chrome iron ore, the ordinary commercial source of chromium and chromium compounds, contains iron oxid; and by treatment of this ore by the present process this iron can be removed leaving chromium sesquioxid behind. The chromic oxid thus prepared and purified is suitable for direct smelting to make metallic chromium by the various electrothermic processes. Chromium residues containing Fe but no gangue may be thus purified, and the purified material may then be used in the preparation of metallic chromium by alumino thermic processes. Or, in making ferrochromium, the iron present in the ore can be reduced to any desired degree. In so purifying chrome iron ore, the granulated or powdered material is simply exposed to the flame and hot flame gases coming from a suitable burner fed with chlorin and hydrogen at low pressure. The iron is converted into a volatile chlorid which passes forward in vapor form with the HCl produced in combustion. By cooling the effluent vapors somewhat, the ferric chlorid can be condensed, allowing the HCl to pass forward for subsequent condensation. As a rule after so condensing the ferric chlorid, or the main bulk thereof, I scrub the HCl with saturated muriatic acid (hydrochloric acid) to remove residual traces of iron and other chlorids prior to recovering the HCl as I thereby produce a purer acid.

Another material which may be usefully treated by the present process is the fused aluminum oxid in granular form prepared as an abrasive and refractory material by electrothermic fusion of bauxite. As ordinarily made, the fused material is crushed and sized ready for use. It is often then treated in magnetic separators for the removal of ferro-silicon, ferro-silicon-titanium alloys, etc. This treatment removes much of these impurities, but there is always residual impurities which cannot be removed mechanically. Tiny particles of the various alloys are retained in and on the surface of the grains. Whatever the fineness of the granulated material, and it is often reduced as fine as 200-mesh, residual impurity still remains after the magnetic separation. The present process offers a convenient method of removing this impurity. The granulated or powdered abrasive is simply exposed to a high temperature in the presence of the flame and flame gases from the hydrogen-chlorin burner. Ferric chlorid, silicon chlorid, etc., volatilize as before.

Chlorin and hydrogen from any convenient source may be employed in the present invention. The gases taken directly from electrolytic cells producing caustic soda may be conveniently employed. With these pure gases, temperatures well in excess of 1000° C. are easily practicable. Where lower temperatures are desired, or are sufficient, the excess of hydrogen or of chlorin over the theoretical proportions necessary for the formation of HCl may be materially increased; this excess now acting as a diluent. Or chlorin containing large proportions of other gases, which may be inert, may be used. The "blow-off" gas from chlorin liquefiers, which sometimes contains as high as 70 per cent of other gases (air, etc.) has been successfully used.

While various types of apparatus may be employed in the present invention, I find it generally convenient to employ a rotary reaction chamber, feeding the material therethrough against a countercurrent of hot gases coming from a chlorin-hydrogen burner.

In the accompanying illustration I have shown, more or less diagrammatically certain apparatus under the present invention and useful in the performance of the described process. The figure is a view in longitudinal vertical section, certain parts being shown in elevation.

In the drawing element 1 is a revoluble retort made of any suitable refractory material resistant to the action of chlorin, HCl, etc., such as stoneware, graphite crucible material, silica tile, etc. As shown, this retort is of built-up structure and is mounted in a steel or iron jacketing casing 2 with heat insulating bricks 3 therebetween. At the ends, the casing is flanged at 5 to make contact with a similar flanging element 6 on stationary housings 7 and 8. The apparatus is supplied with the usual riding rings 9 and is rotated by means (not shown) similar to those usually employed for rotary kilns. The kiln is set at a slight angle from the horizontal to permit feeding material therethrough in a well-understood way. Solid material to be treated is fed in through one of the end-housings by means of hopper 10, feed conduit 11 and screw conveyor 12. At the other or lower end of the apparatus, the stationary housing (8) carries a hydrogen-chlorin burner shown as constructed like an ordinary blast lamp with shell 13, inner tube 14 and two gas inlets 15 and 16, and flame spreader or baffle 13'. Either gas may be used in the inner tube; this being a matter of convenience. Chlorinated materials pass downwardly through duct 17 in the casing at the lower end to a suitable place of disposition (not shown). At the other end the hot gases and vapors from the kiln pass through vertical conduit 18 to chlorid condenser 19. As shown, this condenser is particularly adapted for the collection of ferric chlorid and is provided with a temperature controlling oil filled casing 20 and an internal ribbon conveyor 21 adapted to force deposited ferric chlorid out through gated discharge 22. Uncondensed vapors and gases rich in HCl pass through exit conduit 23 to a muriatic scrubber 24. This scrubber serves to remove condensable chlorids, such as any ferric chlorid escaping uncondensed. As shown, it is an ordinary tower scrubber filled with any of the ordinary acid resistant packings, such as quartz, coke, etc. Strong hydrochloric acid (muriatic acid) is kept in circulation through the tower in cyclic manner by means of pump 25, spray nozzle 26 and return conduit 27. Fresh scrubbing acid or water may be added from time to time through inlet 28 on the suction side of the pump and waste acid removed through valved outlet 29 on the pressure side of the pump. The scrubbed gases, which now consist mainly of HCl with whatever excess of hydrogen or chlorin was employed, and, usually, with some air, go forward through 30 to suitable means (not shown) for collecting and recovering the HCl as commercial acid (muriatic acid or hydrochloric acid). The whole apparatus is usually run under some degree of suction to prevent outward leakage and this causes entrance of more or less air into the system; and where dilute chlorin is employed, as it may be, there is usually more or less air from this source also.

The operation of the above device is believed evident from the showing. Presuming the material to be treated is chrome iron stone from which the iron oxid is to be removed in whole or in part, the powdered material is fed through 10 and 11 by means of 12 into the interior of the kiln, down through which it passes in countercurrent to the flame and hot gases coming from the hydrogen-chlorin burner, passing finally through 17 with its iron content reduced or removed. The iron chlorid formed passes, together with HCl, etc., down through 18 into 19 where the mixture of gases and vapors is somewhat cooled with deposition of ferric chlorid which is removed continuously or from time to time by the operation of screw conveyor 21. The gases which may still contain some ferric chlorid pass through 23 into scrubber 24, where they are washed with a saturated solution of HCl kept in cyclic circulation by pump 25. Here the last traces of ferric chlorid are removed. Other volatile chlorids which may be formed in the operation are similarly removed by the aqueous acid. The purified uncondensed HCl passes through 30 to a place of use or recovery (not shown).

The operation is exactly the same in freeing bauxite or alumina abrasives of traces of iron. In recovering tin from poor tin ore, stannic chlorid is formed and this passes through 18 into 19 where it is condensed, a suitable temperature being maintained by jacket 20. Stannic chlorid being liquid, it may be simply drained off at 22. Various other metallic chlorids may be recovered in a similar way.

What I claim is:—

1. In the chloridizing of materials with the aid of heat, the process which comprises burning hydrogen and chlorin together in proximity to the material to be chloridized.

2. The process of chloridizing materials which comprises feeding such materials in countercurrent to the flame and hot gases coming from hydrogen burning with chlorin.

3. In the removal of iron from materials containing the same, the process which comprises treating such material with hot flame gases coming from a flame of hydrogen burning with chlorin.

4. In the removal of iron from materials with production of acid, the process which comprises exposing said material to hot flame gases coming from a flame of hydrogen burning with chlorin, cooling the effluent mixture of gases and vapors to condense ferric chlorid and thereafter recovering HCl in aqueous solution.

5. In the removal of iron from materials with production of acid, the process which comprises exposing said material to hot flame gases coming from a flame of hydrogen burning with chlorin, cooling the effluent mixture of gases and vapors somewhat to condense ferric chlorid, scrubbing with concentrated aqueous HCl to remove residual iron and collecting residual HCl gas in aqueous solution.

6. As a new apparatus for chloridizing ores, a furnace chamber, means for feeding materials to be chloridized thereto, means for removing chloridized materials therefrom, means for collecting and recovering vapors and gases coming therefrom and means for burning hydrogen with chlorin in said furnace chamber.

In testimony whereof, I have hereunto affixed my signature.

FRANK S. LOW.